United States Patent [19]
Hale

[11] 3,950,585
[45] Apr. 13, 1976

[54] SANDWICH PANEL STRUCTURE

[76] Inventor: Jesse R. Hale, 25913 Stanford St., Hemet, Calif. 92343

[22] Filed: Sept. 20, 1974

[21] Appl. No.: 507,753

Related U.S. Application Data

[63] Continuation of Ser. No. 307,599, Nov. 17, 1972, abandoned.

[52] U.S. Cl. ............... 428/181; 428/179; 428/182; 428/186
[51] Int. Cl.² ...................... B32B 1/00; B32B 3/00
[58] Field of Search ........... 161/125, 130, 133, 136, 161/137, 139; 156/210; 52/613, 618, 625, 630, 671, 672; 29/183; 428/179, 181, 184–186, 59

[56] References Cited
UNITED STATES PATENTS 3,235,432  2/1966  George ............................ 161/139
3,313,080  4/1967  Gewiss ............................ 52/618

Primary Examiner—George F. Lesmes
Assistant Examiner—Paul J. Thibodeau
Attorney, Agent, or Firm—Edward A. Sokolski

[57] ABSTRACT

Sections of sandwich panel structure have corrugated cores which may be formed from folded sheets or plates, the fold lines of each such section forming an oblique angle with the edges of the panel section. A composite panel may be formed from a plurality of such panel sections which join together along pairs of edges thereof, a shear plate being placed along such edges to extend between the panel surfaces to provide structural continuity between the panel sections.

9 Claims, 14 Drawing Figures

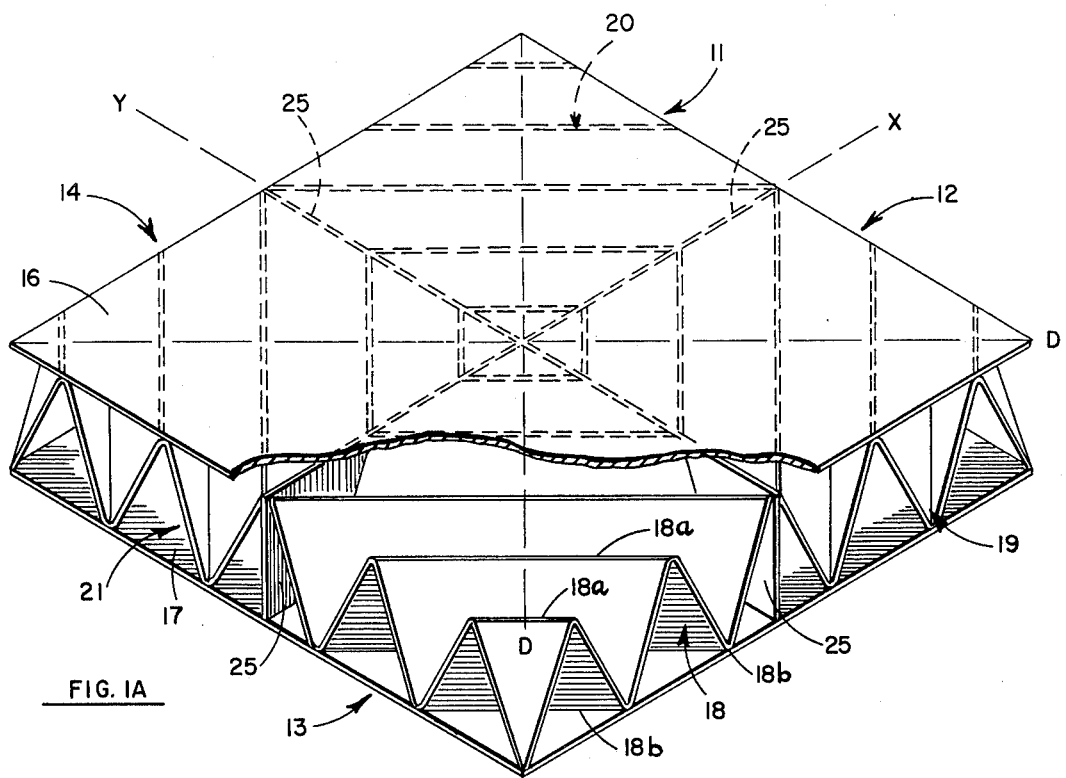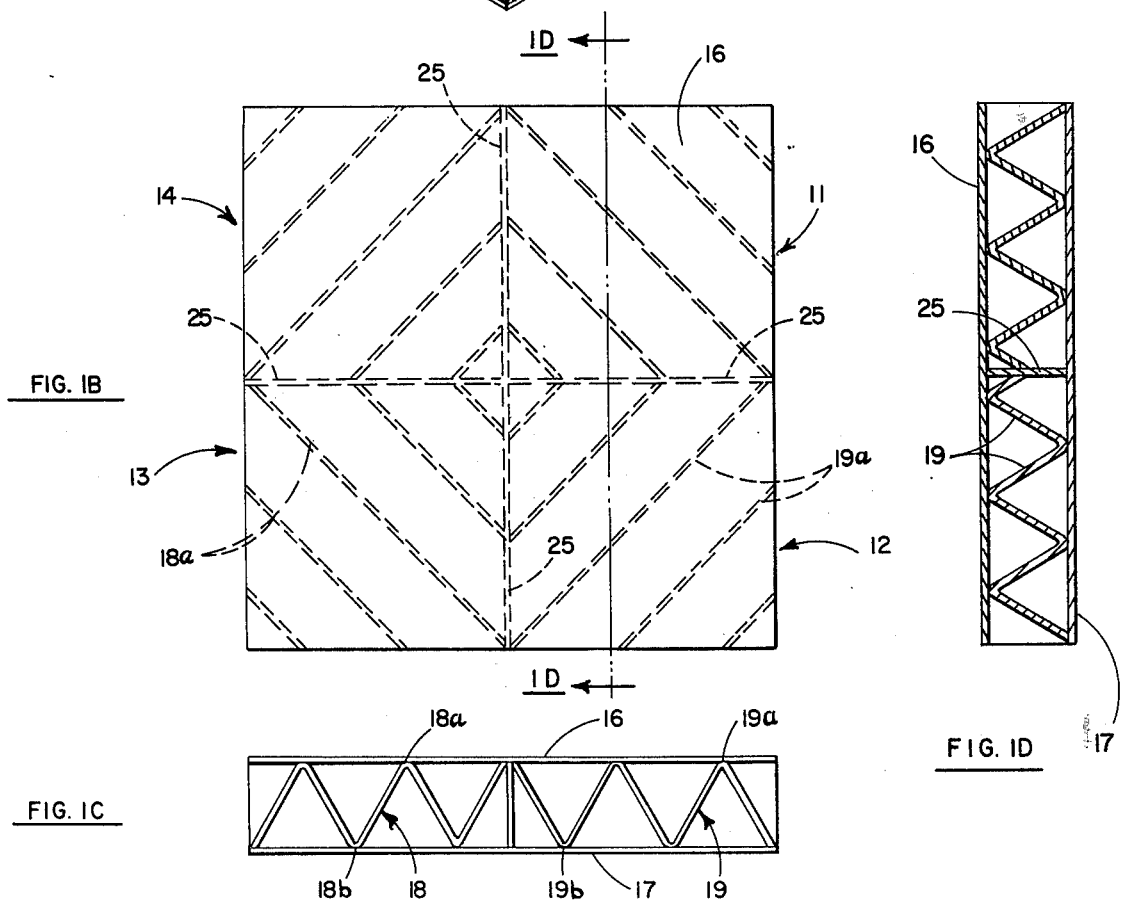

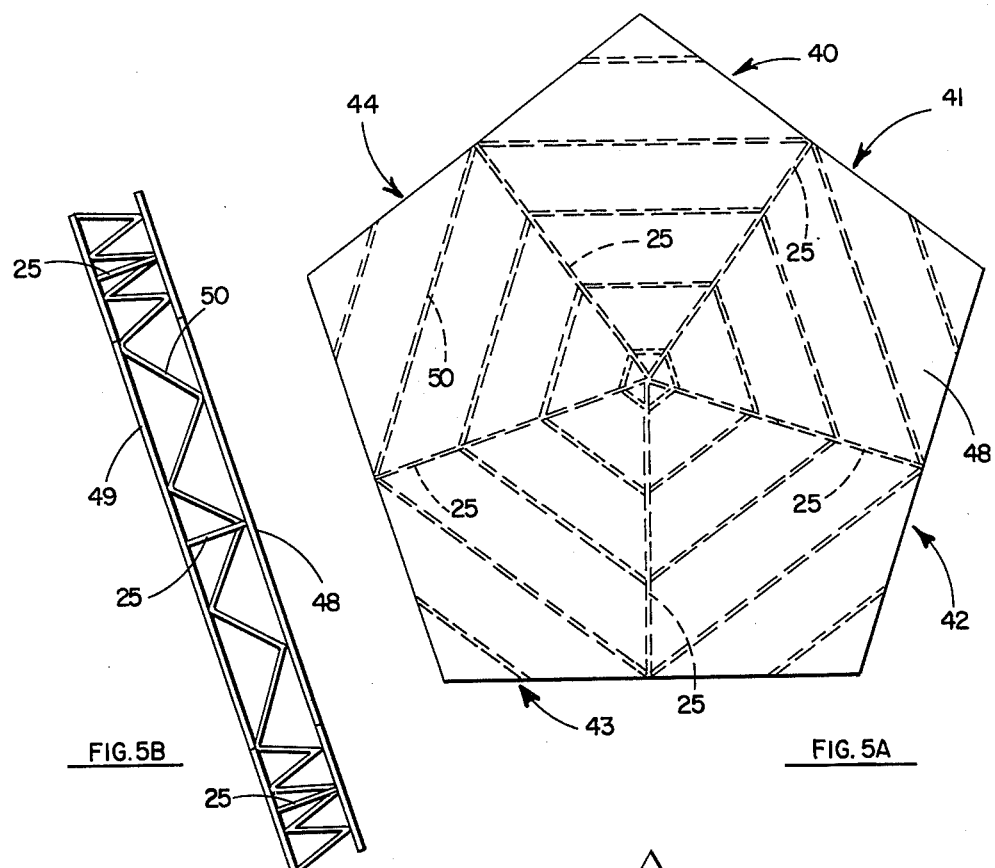
FIG. 5B
FIG. 5A
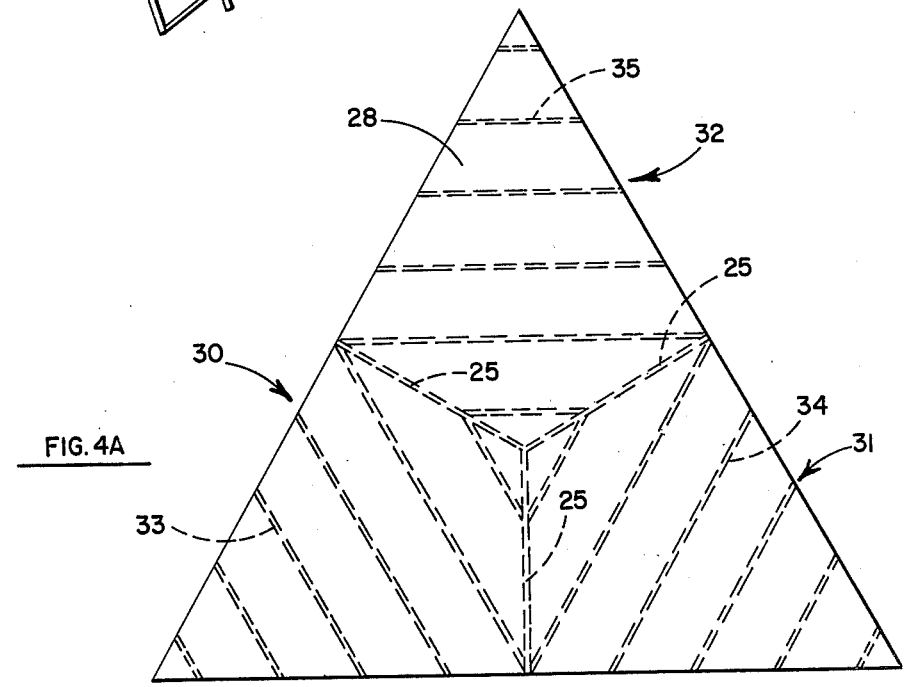
FIG. 4A
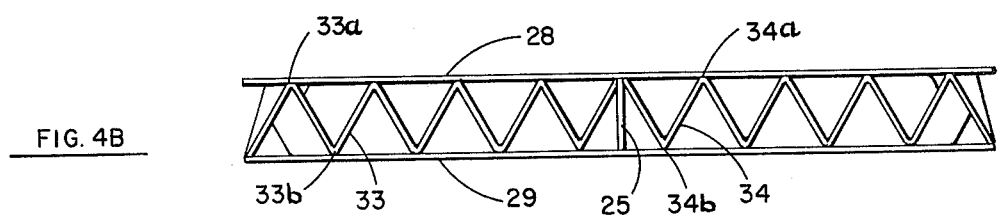
FIG. 4B

SANDWICH PANEL STRUCTURE

This application is a Continuation of my application Ser. No. 307,599, filed Nov. 17, 1972, now abandoned.

This invention relates to sandwich panel structures, and more particularly to such a structure utilizing a corrugated core.

Sandwich panel structures have come into widespread use particularly in applications requiring light weight structures having high strength to weight ratios. Many efforts have been made to design the core structure to optimize the capabilities for handling both compression and shear loads. One such approach has involved the utilization of a zigzag corrugated core configuration which is periodic, i.e., repeats itself for each corrugation within each panel section, such as described in Pat. No. 2,963,128 to E. G. Rapp. It has been found that such corrugated core structure designs of the prior art have certain shortcomings which it is believed the present invention overcomes. Firstly, the periodic zigzag corrugation fails to approach the desired structural orthotropy of superposed orthogonal corrugations, i.e., the quality of having the same values for one or more structural properties in orthogonal directions. Further, this prior art design approach does not lend itself to design flexibility for optimization for each particular application requirement.

The structure of this invention affords an improvement over the aforementioned prior art sandwich panel structures in affording a structure utilizing a corrugated core which has a configuration which can approach the desired orthotropic properties. Further, the design of the invention lends itself to variations within the framework of the basic design approach which can be optimized for each application requirement.

It is therefore an object of this invention to provide an improved sandwich panel structure which has structural properties which approach isotropy from the center of load as well as the form of orthotropy of a superposed mutually orthogonal set of folded plates.

It is another object of this invention to provide a sandwich panel with a corrugated core configuration which can be optimized for specific application requirements.

Other objects of this invention will become apparent as the description proceeds in connection with the accompanying drawings, of which:

FIG. 1A illustrates in perspective an embodiment of the invention comprised of panel sections arranged in a square configuration;

FIG. 1B is a top plan view of the embodiment of FIG. 1A;

FIG. 1C is an end elevation view of the embodiment of FIG. 1A (all edges);

FIG. 1D is a cross sectional view taken along the plane indicated by 1D—1D in FIG. 1B;

FIG. 4A is a top plan view of an embodiment of the invention arranged in a triangular configuration;

FIG. 4B is an end elevation view of the embodiment of FIG. 4A;

FIG. 5A is a top plan view of an embodiment of the invention comprised of panels arranged in a pentagonal configuration;

FIG. 5B is a side elevation view of the embodiment of FIG. 5A;

Figures 2A, 2B, 2C:
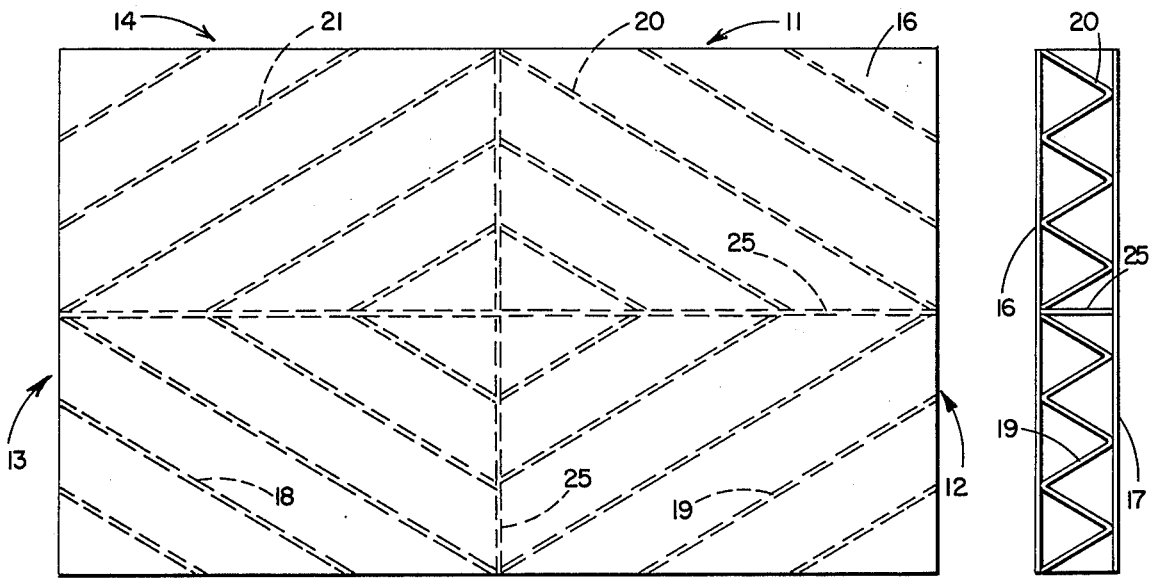
FIG. 2A is a top plan view of an embodiment of the invention comprised of panel sections arranged in a rectangular configuration.
FIG. 2B is an end elevation view of the embodiment of FIG. 2A.
FIG. 2C is a side elevation view of the embodiment of FIG. 2A.

For the purposes of the following discussion, the term "isotropy" is used to define the structural characteristic whereby there are substantially identical values for a given structural property or properties in all directions from a given point on the structure. The term "orthotropy" is used to define the quality of having substantially identical structural properties from a given point in mutually orthogonal directions.

Briefly described, the invention comprises a structural sandwich panel having a corrugated core which may be formed from a folded plate or plates, the fold lines of such core abutting against oppositely positioned panel sheets. Sections of such sandwich panels have cores in which each fold line runs unidirectionally and forms an oblique angle with the edges of the sandwich panel sections. An integrated structure is formed from a combination or synthesis of such sandwich panel sections joined together along their edges, with a shear plate being placed at the juncture of such edges, such shear plate running at a perpendicular angle to the panel surfaces. Various combinations of such sandwich panel sections can be used to synthesize sandwich panel structures having optimum structural characteristics for each application requirement.

Referring now to FIS. 1A–1D, a first embodiment of the invention is illustrated. A square panel structure is formed from four panel sections 11–14, which are synthesized together to form an integral structure. The structure comprises a pair of oppositely positioned flat panels 16 and 17 placed parallel to each other which may be metal, plastic, wood or other structural material. Panels 16 and 17 have sadwiched therebetween four separate corrugated core sections 18–21. The core sections are all identical in construction, and therefore only one of these sections, 18, will be described. Core section 18 is in the form of a folded plate having fold or ridge lines 18a which abut against upper panel 16 and ridge lines 18b which abut against lower panel 17. Separating the core sections 18–21 from each other are reinforcing means in the form of shear plates 25 which are flat plates extending perpendicularly between the inner surfaces of panels 16 and 17. The fold lines 18a and 18b form an oblique angle with the edges of panels 16 and 17 and the surfaces of shear plates 25, this angle being 45°. The shear plates 25 give continuity to the composite structure which is thus formed from four similar sections joined together along pairs of edges which are located at the apothems of the composite square sandwich panel.

As can best be seen in FIG. 1D, the core section portions (including portions of both maximum amplitude and less than maximum amplitude) which abut against shear plates 25 are bonded to the shear plates at the points of abutment therebetween. These shear plates so provided at the junction between the edges of the core sections connect these edges of the core with the panel face sheets. This assures that those portions of the core at this cross section which have less than maximum amplitude will have structural continuity.

While the shear plate is the preferred means for enhancing structural continuity at intersections between folded plate sections, other means can be used for this function such as applying structural foam in the proximity of the intersections, replacing the shear plate with a rectangular tube (box beam), or continuing the folded plate sections past the joint in a superposed manner.

This panel structure is orthotropic in that mutually orthogonal plane sections, i.e., sections parallel to the "X" and "Y" axes shown in FIG. 1A have the same periodicy; the magnitude of "periodicy" being defined by the number of fold lines 18$a$ and 18$b$ encountered. Further, the panel exhibits an increase in shear rigidity in going from the apothems towards the diagonals, "D", in that radial plane sections have a periodicy of increasing frequency toward the diagonals.

Referring now to FIGS. 2A, 2B and 2C, another embodiment of the invention is illustrated. This embodiment is similar to the first described embodiment except that the composite panel structure is rectangular in form rather than square and is formed from four rectangular sections 11–14. As for the first embodiment, shear plates 25 are utilized to provide continuity between the sandwich panel sections. It is also to be noted that the fold lines 18$a$–18$b$, 19$a$–19$b$, etc., intersect the edges of the panels and the shear plates at an oblique angle.

Figure 3:
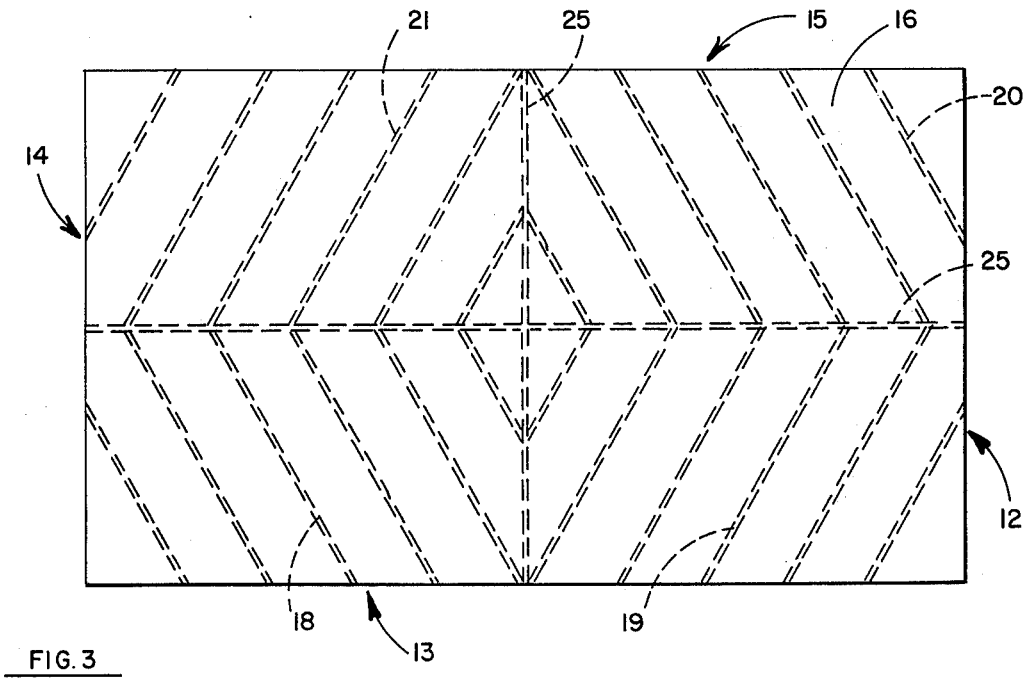
FIG. 3 is a top plan view of another embodiment of the invention comprised of panel sections arranged in a rectangular configuration.

Referring now to FIG. 3, another rectangular panel structure is illustrated. This panel structure is similar to that just described, except for the fact that the angles between the fold lines of the corrugations and the longer edges of the panel are closer to 90° than that for the panel of FIGS. 2A–2C; the angles for the embodiment of FIGS. 2A–2C being about 45°. This results in much greater periodicy in the lengthwise dimension than the width dimension of the embodiment of FIG. 3, as compared with the same periodicy for the embodiment of FIGS. 2A–2C. This makes for substantially greater shear modulus along the lengthwise dimension of the embodiment of FIG. 3 than along the widthwise dimension, while in the embodiment of FIGS. 2A–2C, the shear modulus is substantially the same in length as in width. It thus can be seen that the structural characteristics of a particular panel can be designed to meed specific application requirements by changing the angulation of the core structure fold lines relative to the edges of the panel.

Referring now to FIGS. 4A and 4B, a panel configuration in the form of a triangle is illustrated. This panel structure is formed from three similar sandwich panel sections 30–32 having corrugated cores 33–35 similar to those for the previous embodiments but arranged in a triangle configuration. Shear plates 25 are used as for the previous embodiments to provide continuity between the panel core sections, such core sections being sandwiched between flat panels 28 and 29. As for the rectangular embodiments, the angle of intersection of the fold lines 33$a$, 33$b$, 34$a$, the 34$b$, etc., with the edges of the panel can be varied to suit different structural requirements.

A great variety of other geometric shapes can be utilized for the panel, as for example, the pentagonal shape illustrated in FIGS. 5A and 5B, which includes five similar sandwich panel sections 40–44 wich shear plates 25 providing structural continuity therebetween. The corrugated core structures 50 are in this instance sandwiched between pentagonal panels 48 and 49.

Figure 6A:
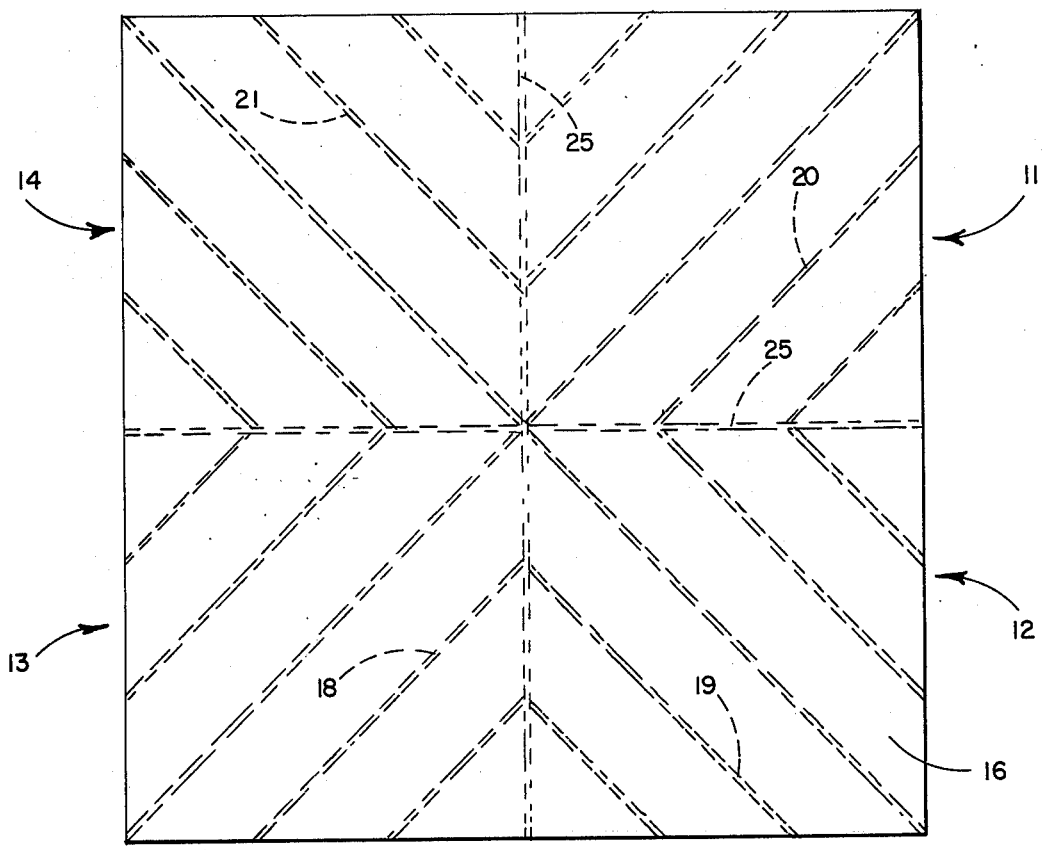
FIG. 6A is a top plan view of still another embodiment of the invention comprised of panels arranged in a square configuration but with the fold lines of the corrugations running normal to those of the embodiments of FIGS. 1A–1C.
Figure 6B:
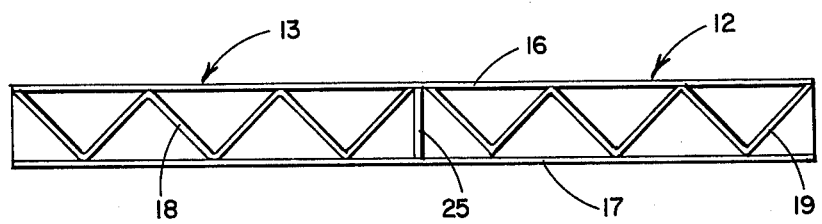
FIG. 6B is a side elevation view of the embodiment of FIG. 6A.

Referring now to FIGS. 6A and 6B, a square sandwich panel configuration is illustrated having sandwich panel sections 11–14. These panel sections have corrugated cores 18–21 and shear plates 25 sandwiched between panel sheets 16 and 17. This panel structure differs from the panel structure of FIGS. 1A–1D in that the fold lines of the core structure are oriented parallel to one or the other of the diagonals of the composite panel and are thus in a right-angle relationship to the fold lines of the first embodiment. This in effect produces an opposite phase in the periodicy of the core structure which is inverse to that of the first embodiment. It can be readily seen that this embodiment has a geometric orthotropic periodicy which is the same as that of the embodiment of FIGS. 1A–1D, i.e., the same periodicy exists for mutually orthogonal sections parallel to the edges of the panel. However, this form of the invention has a radial periodicy in which the frequency decreases from a maximum at the apothems to zero at the diagonals. Further, the periodic stress elements of mutually orthogonal plane sections lying on the same folded plate are oppositely disposed so that if one is in tension, the other is in compression, or vice versa. Thus, it an be seen that this particular panel structure has structural qualities significantly different from that of the previous embodiments, which can be utilized to advantage for particular application requirements.

The sandwich panel structure of this invention thus affords structural characteristics which can be optimized to provide high strength to weight characteristics for each specific application requirement.

While the invention has been described and illustrated in detail, it is to be clearly understood that this is intended by way of illustration and example only and is not to be taken by way of limitation, the spirit and scope of this invention being limited only by the terms of the following claims.

I claim:

1. A sandwich panel structure comprising:

a pair of flat panel sheets oriented opposite each other in parallel relationship, a plurality of similar periodic corrugated core sections sandwiched between said panel sheets, each of said core sections having a first set of fold lines forming ridges each of which runs unidirectionally and abuts against one of said sheets and a second set of fold lines forming ridges each of which runs unidirectionally and abuts against the other of said sheets, said fold lines each intersecting adjacent pairs of edges of said sections at predetermined oblique angles, said core sections being joined together along pairs of edges thereof, and reinforcement means extending along the adjoining edges of said sections to provide structural continuity therebetween.

2. A sandwich panel structure comprising:

a pair of flat panel sheets oriented opposite each other in parallel relationship, a plurality of similar periodic corrugated core sections sandwiched between said panel sheets, each of said core sections having a first set of fold lines forming ridges each of which runs unidirectionally and abuts against one of said sheets and a second set of fold lines forming ridges each of which runs unidirectionally and abuts against the other of said sheets, said fold lines each intersecting the edges of said panel structure at an oblique angle, said core sections being joined together along pairs of edges thereof, and a shear plate extending perpendicularly between said panel sheets along the adjoining edges of said core sections to provide structural continuity therebetween.

3. The sandwich panel structure of claim 2 wherein the structure has a rectangular configuration and has four symmetrically arranged similar rectangular core sections, the fold lines of oppositely positioned core sections being parallel to each other, the fold lines of adjoining core sections being angulated with respect to each other.

4. The sandwich panel structure of claim 3 wherein the overall structure and the core sections are square, and the fold lines of adjoining core sections forming a 45° angle with respect to the panel edges.

5. The panel structure of claim 3 wherein there are a greater number of fold lines intersecting one pair of edges of the structure than the other pair of edges of the structure.

6. The panel structure of claim 3 wherein the fold lines are parallel to one or the other of the diagonals of the structure.

7. The panel structure of claim 4 wherein adjoining core section fold lines form squares.

8. The panel structure of claim 2 wherein the structure is triangular and is formed from three similar symmetrically arranged triangular core sections.

9. The panel structure of claim 2 wherein the structure is in the form of a pentagon and is formed from five similar symmetrically arranged core sections.

* * * * *